United States Patent [19]

Chiang et al.

[11] Patent Number: 5,463,670
[45] Date of Patent: Oct. 31, 1995

[54] TESTING OF COMMUNICATION SERVICES AND CIRCUITS

[75] Inventors: Marilyn C. Chiang, Manalapan; R. Earl Fenley, Jr., Point Pleasant; George F. Holland, Neshanic; Anand K. Javvaji; Ramadevi Sreedhara, both of Iselin, all of N.J.

[73] Assignee: AT&T IPM Corp., Coral Gables, Fla.

[21] Appl. No.: 965,458

[22] Filed: Oct. 23, 1992

[51] Int. Cl.$^6$ .................................................. H04M 1/24
[52] U.S. Cl. ............................................................... 379/27
[58] Field of Search ................................ 379/27–29, 9, 379/10, 11, 18, 41, 5, 6, 15

[56] References Cited

U.S. PATENT DOCUMENTS

| | | | |
|---|---|---|---|
| 4,021,624 | 5/1977 | Kelly et al. | 379/18 |
| 4,311,882 | 1/1982 | Johner et al. | 379/18 |
| 4,430,530 | 2/1984 | Kandell et al. | 379/6 |
| 4,764,949 | 8/1988 | Faith et al. | 379/9 |
| 5,073,919 | 12/1991 | Hagensick | 379/29 |

OTHER PUBLICATIONS

R. Perdue et al. Conversant® 1 Voice System: Architecture and Applications, AT&T Technical Journal, vol. 65, Issue 5, pp. 34–47. Sep.–Oct., 1986.

K. H. Nilsen "Measuring Network Performance with Automatic Test Calls" IEEE International Conference on Communications, Boston, Mass., pp. 385–388.

G. K. Kelly, "A Microprocessor–Based Telex Traffic Route Tester", Conference on Microprocessor Systems, 1981, pp. 54–58.

M. Hammano, et al. "Development of Multiload Test Call Generation/Remote Patch Throwing Control for Telex Switchboard", KDD Technical Journal, No. 142, pp. 68–75. This reference may possibly be relevant based on the Abstract obtained in a computer literature search (copy attached) which is in English. A translation of the reference has not been obtained.

*Primary Examiner*—Stephen Chin
*Assistant Examiner*—Kevin Kim

[57] ABSTRACT

Communications services and circuits are tested by a system which includes a voice response unit (VRU) operating under the control of processes performed in a workstation. The system can automate the various tasks associated with making test calls, such as by initiating one or multiple simultaneous test calls to a customer's telephone number, and then by playing a stored voice message when any of the test calls is answered by customer personnel, or by establishing a voice path that can be used to talk to the customer personnel. The circuits being tested are then monitored by the VRU, which can both detect supervisory signals as well as perform call disposition analysis by detecting ring, ring/no answer, busy, fast busy, tones, or other audible conditions that are indicative of many circuit abnormalities. A display indicates test system status to a technician, including the progress of all test calls as well as information pertaining to the test system itself. The system can be used by several technicians at one time.

5 Claims, 8 Drawing Sheets

| DISPOSITION CODE | TEST CALL DISPOSITION |
|---|---|
| 01 | 60 IMPULSES PER MINUTE (BUSY SIGNAL) |
| 02 | 120 IMPULSES PER MINUTE (REORDER (RO), ALSO KNOWN AS FAST BUSY) |
| 03 | ANSWER(VOICE OR RING STOPPED) |
| 04 | NO ANSWER AFTER N RINGS |
| 05 | HIGH AND DRY(NO RING OR VOICE OR BUSY OR REORDER) |
| 06 | TONE(MODEM TONE) |
| 07 | SPECIAL INFORMATION TONE (SIT) - REORDER (RO) IntraLATA |
| 08 | SIT:REORDER (RO), InterLATA |
| 09 | SIR:NO CIRCUIT (NC), IntraLATA |
| 10 | SIT:NO CIRCUIT (NC), InterLATA |
| 11 | SIT:VACANT CODE (VC) |
| 12 | SIR:INTERCEPT |
| 13 | SIT:INEFFECTIVE-OTHER |
| 14 | SIT:DOMESTIC OTHER |
| 15 | SIT:INTERNATIONAL OTHER |
| 16 | SIT:INTERNATIONAL NO CIRCUIT (NC) |
| 17 | SIT:INTERNATIONAL FOREIGN FAILURE |
| 18 | SIT:UNKNOWN TYPE |
| 19 | ERROR,SOME UNEXPECTED CONDITION OCCURRED |
| 20 | TIMEOUT,CANNOT CLASSIFY CALL WITHIN TIME ALLOWED |
| 21 | INVALID DIAL STRING |
| 22 | MAXIMUM NUMBER OF CDA JOBS ALREADY RUNNING |

FIG. 4

| SAY MESSAGE PHRASES-NO RESPONSE EXPECTED | |
|---|---|
| PHRASE | ID |
| NULL (NO PHRASE) | 00 |
| THIS IS AT&T TESTING, PLEASE HOLD | 01 |
| THE TEST IS COMPLETE, PLEASE HANGUP, THANK YOU | 02 |

FIG. 5

| SAY MESSAGE PLRASE-RESONSE EXPECTED | |
|---|---|
| PHRASE | ID |
| IF YOU CAN HEAR THIS MESSAGE WELL-PRESS 1 IF NOT PRESS2 | 51 |
| THIS IS AT&T TESTING, IF YOU CAN HEAR THIS MESSAGE WELL-PRESS 1, IF NOT PRESS 2 | 52 |

FIG. 7

FLOW OF MESSAGES WITH SAY OPTION

FIG. 9

| DISPOSITION DETAIL ||
|---|---|
| DISPOSITION | CODE |
| BUSY | B |
| RECORDER | R |
| ANSWER | A |
| NO ANSWER | N |
| NO RING NO ANSWER (HIGH & DRY) | H |
| TONE (MODEM OR FAX) | M |
| SPECIAL INFORMATION TONE (SIT) | S |
| TIMEOUT | T |
| INVALID DIAL STRING | I |

TESTING OF COMMUNICATION SERVICES AND CIRCUITS

FIELD OF THE INVENTION

This invention relates generally to testing of communications services and circuits, i.e., lines and/or trunks, and, in particular, to a method and system for making automated test calls.

BACKGROUND OF THE INVENTION

At the present time, troubles in local and long distance telephone circuits are often located by technicians working at test centers using old fashioned electro-mechanical devices that initiate test calls. One such device, known as a Simulated Load Operation Test Set (SLOTS) was manufactured by the Harris Company beginning in the mid-1950's, and is currently "manufacture discontinued" and thus not available for purchase. In operation, the SLOTS device is connected to a switch in the telecommunications network (such as the #4ESS# switching system available from AT&T) through jacks having tip, ring and an E/M signalling arrangement compatible with standard central office test cords. Another jack is provided for connecting a headset to the device. A technician using SLOTS initiates a test call to a customer by dialing the customer's number from a dial or keypad. If the customer (such as a business 800 service subscriber) has multiple circuits that are to be tested, and if a call placed to telephone equipment on a first circuit answers, the customer is advised that a test is in progress, and asked to keep the equipment off-hook while second and subsequent test calls are made by the technician. If certain trouble conditions exist, they are identified when the technician monitors the circuit under test, listening for such conditions as ring, ring/no-answer, busy, fast busy, etc. If a trouble is detected, a trouble ticket is manually prepared and sent to other technicians for further trouble isolation and correction. While one technician can make several (e.g., up to 20) test calls from a SLOTS device, the calls are made one after the other; they are made in rapid succession, so that the customer personnel answering the calls are not required to spend large amounts of time during the testing process. The technician is required to repeat the "announcement" concerning the testing each time a test call is answered, to monitor and interpret test results for each tested circuit, and to prepare and route individual trouble tickets relating to suspected problems, all of which is repetitive, unduly time consuming, and prone to errors.

SUMMARY OF THE INVENTION

In accordance with a preferred embodiment of the present invention, we have recognized that a voice response unit (VRU), operating under the control of processes performed in a workstation which includes a processor, can automate the various tasks associated with making test calls to test communications circuits and services, that are now performed by a technician using a SLOTS device or similar apparatus. The VRU is connected via multiple trunks to a switch in the telecommunications network and arranged to initiate one or multiple simultaneous test calls to a customer's telephone number provided by the technician, using some of the trunks. The technician, working at a display associated with the workstation, can send a message to the VRU to select an appropriate voice message stored in the VRU that is automatically played when any of the test calls are answered by customer personnel. The circuits being tested are then monitored by the voice response unit, which can both detect supervisory signals as well as perform call disposition analysis by "listening" on the call to detect ring, ring/no answer, busy, fast busy, tones, or other audible conditions that are indicative of many circuit abnormalities. If a possible abnormality or malfunction is detected, a message can be generated and transmitted to an appropriate maintenance center for disposition. The display can advantageously indicate the test system status to the technician, indicating the progress of all test calls made simultaneously on different customer circuits, as well as information pertaining to the test system itself, which can be used by several technicians at one time. Each technician can establish an "agent voice path" (AVP) so that the technician can talk and listen on one or more test calls and communicate with customer personnel.

BRIEF DESCRIPTION OF THE DRAWINGS

The present invention will be more fully appreciated by consideration of the following detailed description which should be read in light of the accompanying drawing in which:

FIGS. 6 & 7 illustrate the flow of messages between the various components of the system of FIG. 1. FIG. 6 illustrates messages that occur when the TALK option is selected, while FIG. 7 illustrates messages that occur when the SAY option is selected;

DETAILED DESCRIPTION

Figure 1:
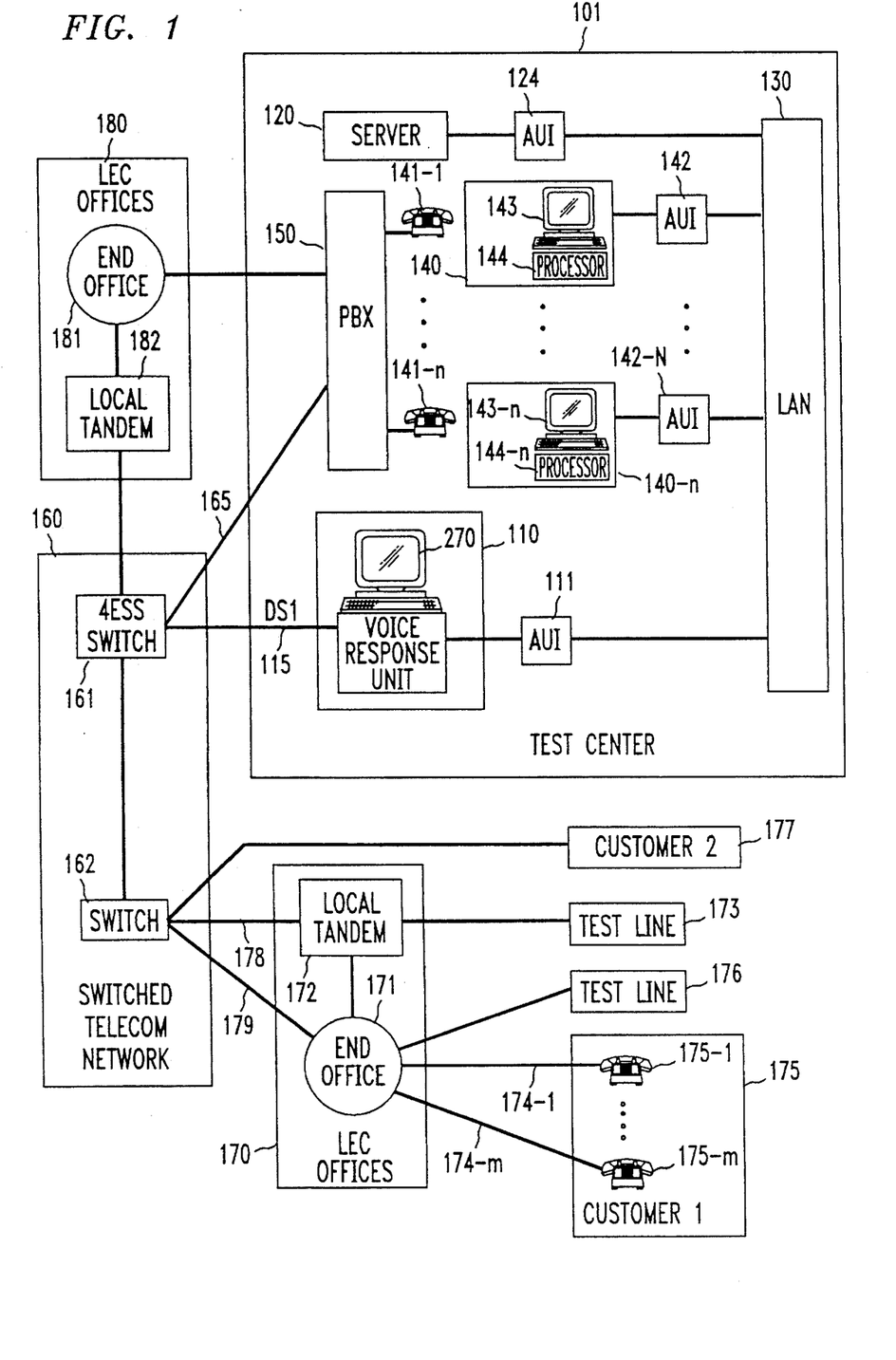
FIG. 1 is a block diagram of an automated multiline testing system arranged in accordance with this invention.

Referring to FIG. 1, there is shown a block diagram of an automated multi-line testing system arranged in accordance with this invention. The system is located in a test center designated generally as 101, at which a plurality of technicians can work at one or more individual workstations 140 to 140-n. At the heart of the testing system is a voice response unit (VRU) 110, which is described in more detail below in conjunction with FIG. 2. Overall control of the functions performed by VRU 110 resides in workstation 140 (and the other workstations 140-n, if they are provided as part of the system). The workstations 140 and 140-n are interconnected with VRU 110 and a server 120, via a local area network (LAN) 130. Depending upon the particular interconnection arrangement used, different interfaces may be chosen for the elements in FIG. 1. In one arrangement, Attachment Unit Interfaces (AUI's) 142 and 142-n (described below) may be used to provide protocol conversion for communication between workstations 140 and 140-n and LAN 130, while AUI's 111 and 124 may provide protocol conversion between VRU 110 and server 120, on the one hand, and LAN 130 on the other hand.

Workstation 140 and other workstations 140-n each include a processor 144 or 144-n, respectively, which includes graphical user interface (GUI) software that allows a workstation user to interact with the system via a display device 143 or 143-n, respectively, and other input devices such as a keyboard and/or a mouse. Each processor 144 or 144-n also contains stored programs which control the overall functions of the test system of the present invention, which are described in more detail below. One type of workstation well suited for this application is a SPARC IPX or IPC system available from SUN Microsystems. The XT Windows system can provide the desired GUI.

Server 120 functions as a message distributor, keeping track of messages that flow between VRU 110 and workstations 140 and 140-n, and vice-versa. Server 120 also stores information describing the technicians using the system and the resources (SATs) currently in use, so that each technician may determine how many resources are available for their use at any given time.

While various arrangements are available for the interconnection of the elements in test center 101 and the switched telecommunications network designated generally as 160, FIG. 1 illustrates a digital DS1 facility 115 interconnecting VRU 110 with a 4ESS™ switch 161 within network 160, and a separate group of trunks 165 interconnecting PBX 150 with switch 161. Facility 115 includes a plurality of channels (specifically 24 DS0 channels) from which 24 trunks are derived. These trunks may be DTMF (touchtone) wink, which have the characteristics of trunks origination at a PBX, or multi-frequency (MF) wink which have the characteristics of trunks originating at a local exchange carder switch. In the subsequent description, any and all of these trunks may be referred to as System Access Trunks (SATs). In order to have sufficient capacity to make the desired number of test calls from test center 101, it may be necessary to provide additional DS1 facilities, not shown. As is well known, network 160 includes a variety of interconnected switches, which are represented for ease of illustration as a single additional 4ESS switch 162, as well as a separate signalling network and other elements, which are not shown.

Test center 101 also includes a private branch exchange (PBX) 150, having a plurality of station sets 141-1 to 141-n, each of which is associated with a corresponding workstation 140-1 to 140-n. These station sets are used by the technicians to talk and listen on test calls made by VRU 110, in the manner described below. PBX 150 can be connected to the switched telecommunications network in any conventional way. This can include a connection to a end office 181 in LEC offices 180. Alternatively, PBX 150 may be connected directly to switch 161 (or any other switch) within switched network 160. A local tandem 182 in LEC offices 180 may be interconnected between switch 181 and switch 161.

FIG. 1 also illustrates a plurality of station sets 175-1 to 175-m, which belong to a particular first customer. These station sets are shown interconnected to an end office switch 171 in a local exchange carder (LEC) offices 170 via lines or circuits 174-1 to 174-m, which together comprise one or more trunks. LEC offices 170 may also include a tandem switch 172. As will be explained more fully below, technicians in test center 101, using the test system of the present invention, can initiate simultaneous test calls to some or all of the first customer's station sets 175-1 to 175-m, (up to the capacity of the test system) thereby testing the communications paths to these stations sets, including, of course, circuits 174-1 to 174-m as well as the different trunks 179 and 178 that interconnect end office 171 and local tandem 172 to switch 162. The technicians can also initiate test calls to test lines 173 and 176, which are provided at local tandem 172 and end office 171, respectively, and which include dummy terminations, not shown. They can also initiate test calls to a second customer 177, that is directly connected to switch 162.

The type of testing described above is important for several reasons: first, it can identify if trouble does indeed exist. Second, it can begin to identify where the trouble is located, i.e, in the customer equipment itself, in the circuits provided by the local exchange company, or in the circuits provided by the interexchange carrier in network 160. Finally, it can assist in actually fixing the problem, as by removing faulty customer equipment. Note that auxiliary test equipment, such as the Maintenance Termination Unit described in the copending application Ser. No. 07/878376, filed May 4, 1992, and assigned to the same assignee as the present invention, can be provided and used by the customer to further assist in trouble isolation and correction.

By arranging some of the trunks on facility 115 to have the characteristics of trunks originating at a local exchange carrier switch, the system of our invention has the capability to initiate test calls that include the originating caller's telephone number or Automatic Number Identification (ANI)or other signals that simulate the origination of many other types of calls. This capability is very useful, because the disposition of these calls, including, for example, special routing based upon ANI, or the provision of Caller-ID, can be tested.

In the remaining portion of the detailed description, for convenience, it is sometimes assumed that test center 101 includes a single workstation 140.

Figure 2:
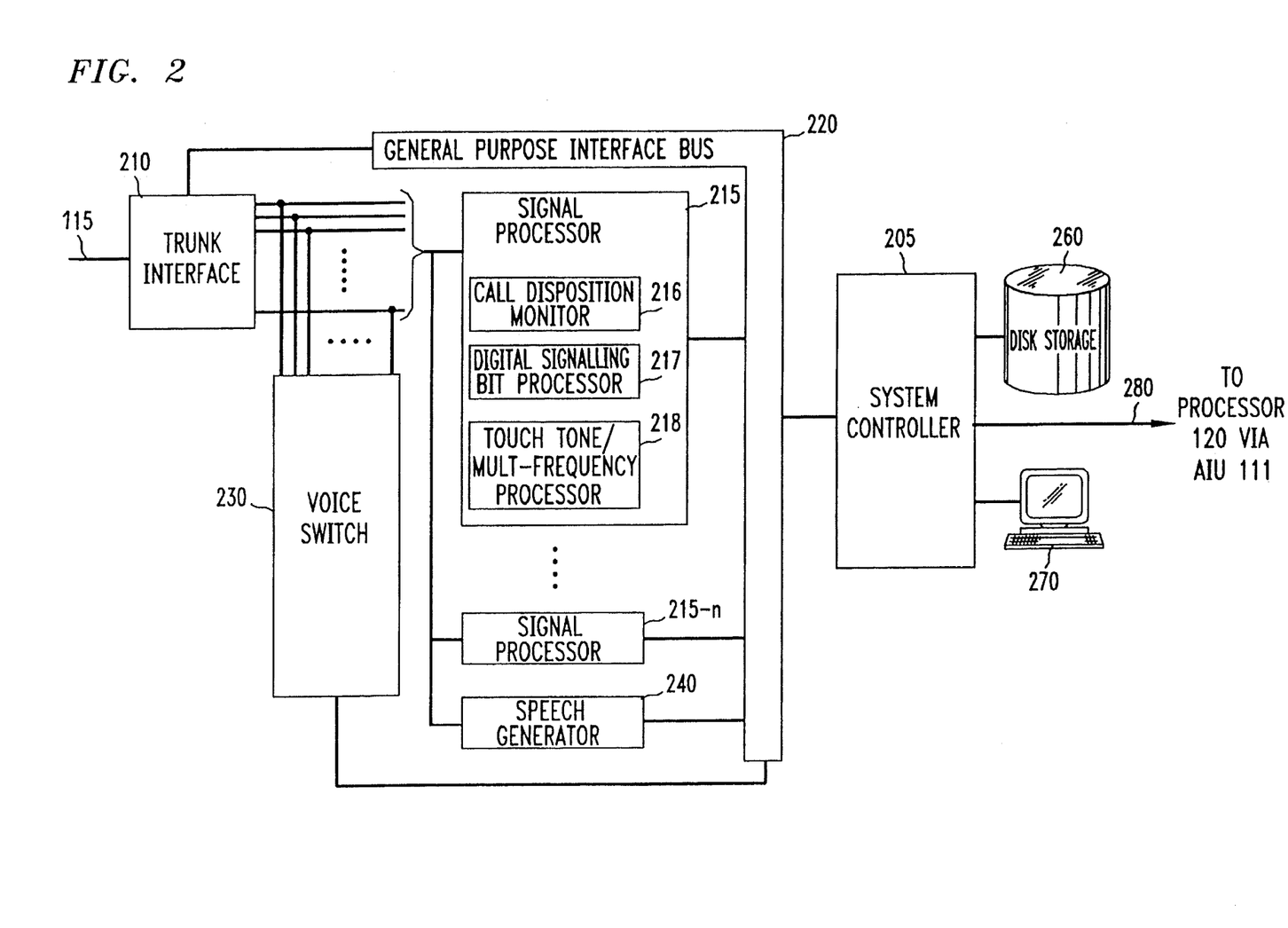
FIG. 2 is a block diagram illustrating one arrangement for VRU 110 of FIG. 1.

FIG. 2 is a block diagram illustrating one arrangement for VRU 110 of FIG. 1, which may be implemented using the AT&T Conversant® Voice System whose architecture and features are described in AT&T Technical Journal, Vol. 65, Issue 5, pp. 34–47, Sep./Oct. 1986. The Conversant System, as well as other commercially available voice response units, have the general capability to (a) initiate multiple simultaneous calls, using an internal touchtone/multi-frequency signal generator, (b) monitor and report supervisory signal status and changes, (c) perform call disposition analysis, (d) say pre-stored speech phrases to the answering party and listen for Touchtone responses, (e) send acknowledgements based upon the response or lack of response, (f) administer a speech database, and (g) bridge calls. The present invention advantageously uses all of these capabilities.

As stated previously, VRU 110 is connected to switch 161 via at least one DS1 facility 115, which includes 24 individual DS0 channels from which the SATs are derived. When a test call is initiated by a technician, workstation 140 sends a message to VRU 110 via AUI 124, LAN 130, and AUI 111. Server 120 is also involved in transmission of this message. The message is received in VRU 110 via a host interface line 280, and applied to a system controller 205, which operates under the control of application software residing in local disk storage 260 or resident in memory within controller 205. In response to information in the call initiation message, controller 205 generates instructions that are applied via general purpose interface bus (GPIB) 220 to switch 230 and an available signal processor such as signal processor 215. (Note that the VRU illustrated in FIG. 2 includes several signal processors, 215 and 215-n.) These instructions cause a digital signalling bit processor 217 within signal processor 215 to go off hook, and sets the "M" bit on a particular SAT to a "HIGH" value, which is an indication to the connected switch 161 that service is requested. This signal is conveyed to switch 161 via a trunk interface 210. When switch 161 is ready to receive digits, it responds by returning a wink signal recognized on the "E" bit of the SAT by digital signalling bit processor 217. This in turn causes a Touchtone/multi-frequency processor 218 to outpulse appropriate Touchtone or multi-frequency signals, and apply them to the transmit voice path of the SAT derived on facility 115.

After the test call is launched, digital signalling bit processor 217 monitors the "E" bit for a change to "off hook", indicating that the call has been answered. For the duration of the call, digital signalling bit processor 217 continues to monitor the "E" bit to determine if the call is ended by the customer hanging up. At the same time, call disposition monitor 216 is activated to monitor the receive voice path of the SAT, thus automatically determining the existence of various audible conditions such as ring, ring/no-answer, busy, fast busy, etc.

If the test call requires a phrase to be played to the customer personnel answering the test call, a speech generator 240 may be connected to the transmit voice path of the SAT. Speech generator 260 "says" phrases that are stored in disk storage 260. If the phrase requests the customer to respond with a touchtone entry, Touchtone/multi-frequency processor 218 is connected to to the receive voice path of the SAT to detect this response.

If the test call requires the technician to talk to the customer and/or to listen on the test call, an "agent voice path" (AVP) is established in a manner similar to that described above with respect to the test call. Then, switch 230 bridges the test call and the AVP.

As changes in the "E" signalling bit status are recognized in digital signalling bit processor 217 and as the status of test calls is determined by call disposition monitor 216, and as touchtone responses are received by touchtone/multi-frequency processor 218, appropriate messages are formulated in system controller 205 and transmitted to the particular workstation 140 that originated the test call. This workstation can then display the status of the test call.

The operation of the system of the present invention will be better understood from an appreciation of the most significant messages that pass between VRU 110 and workstation 140. These messages are briefly described here. VRU 110 can: (a) initiate a plurality of simultaneous test calls to a customer's station sets, such as stations sets 175-1 to 175-m, in response to a CALL message, and drop test calls in response to a DROP message; (b) perform call disposition analysis (CDA) with respect to each of the calls, and send a CDA message to workstation 140 indicative of the results; (c) monitor call supervision signals generated for each of the test calls, and send a SUPV message to workstation 140 indicative of the results; (d) prepare and send to workstation 140 a CUST_RESP message based upon the response (or lack thereof) received to a speech request that was played to the party answering the test call in response to a SAY message; (e) send an acknowledgement to workstation 140 after implementing each message received from that processor, and (f) administer a speech database by recording speech to be played on certain test calls and relating particular speech phrases to corresponding identifying numbers that are used to request the particular phrase to be "spoken".

In order to permit voice communication between the technician and customer personnel answering a test call, VRU 110 can also establish an agent voice path (AVP) via an available SAT, in response to an AGENT message. The AGENT message includes "setup", "drop" and "verify" options that manage the AVP.

As alluded to above, there are, generally speaking, three types of messages that are sent between VRU 110 and workstation 140. The first type is originated at workstation 140 and sent to VRU 110, requesting VRU 110 to do a particular action. The messages are: AGENT, CALL, DROP, TALK, SAY and DROP_SESSION.

The second type of message originates in VRU 110 and is sent to workstation 140. The messages are SUPV, CDA, AGENT_DISC, and CUST_RESP.

The third type of message is an acknowledgement that VRU 110 sends to workstation 140 after an action is completed. Note, however, that when messages are received in workstation 140, that workstation need not send an acknowledgement to VRU 110.

The type 1 messages initiated at workstation 140 and sent to VRU 110 can have any of the following formats:

(a) AGENT;[[SETUP;digits] DROP VER];user_id (b) CALL;call_id-call_id;digits;rings;[TLK NO_TLK];SAY,[0–99];user_id (c) DROP;call_id-call_id;user_id (d) TALK;call_id-call-id;[ON OFF];user_id (e) SAY;call_id;[0–99];user_id (f) DROP_SESSION;user_id With respect to type 1 messages, "user_id" is a 1 digit number assigned by workstation 140; "call_id" is a 2 digit number; "rings" is a 2 digit number; and "digits" is a number to be outpulsed (including 0–9 and * and #).

Figure 3:
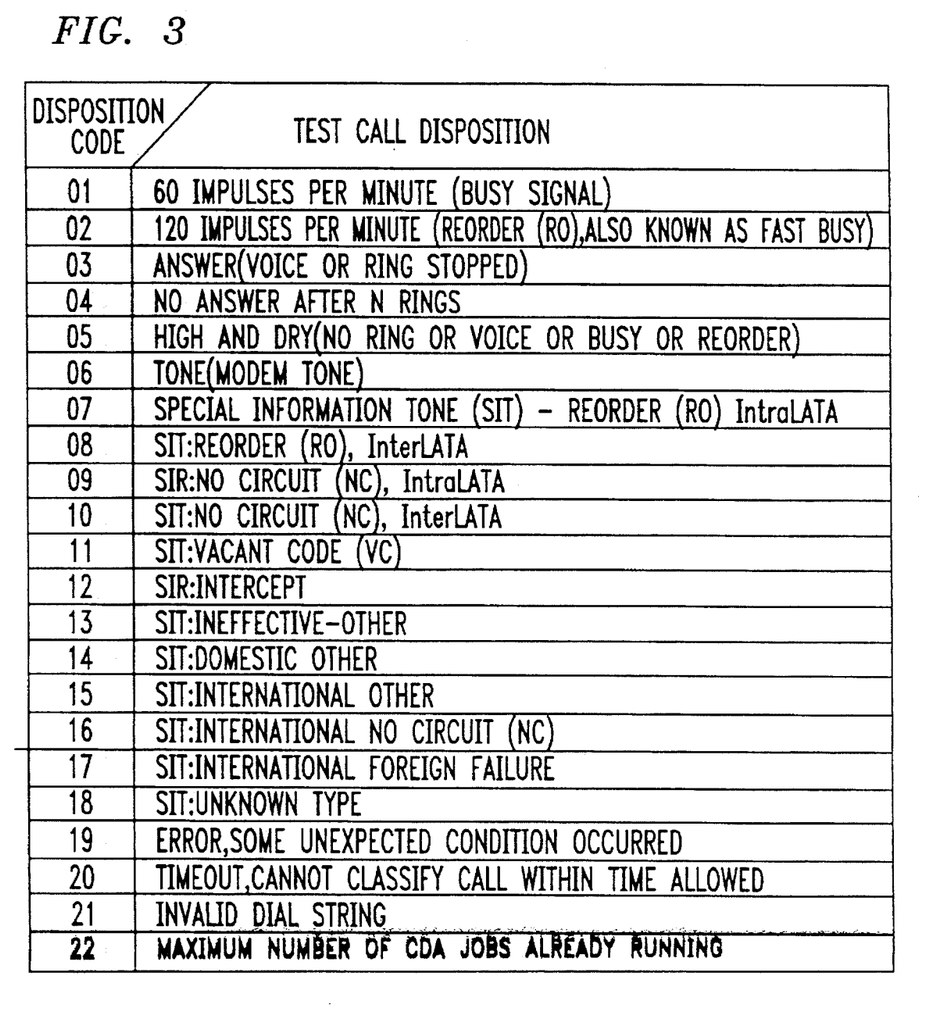
FIG. 3 is a table illustrating the relationship between various two digit disposition codes and the associated dispositions of test calls indicated by each code.

Type 2 messages initiated at VRU 110 and sent to workstation 140 have any of the following formats:

(a) SUPV:call_id,[ON OFF];user_id (b) CDA;call_id,disp;user_id (c) CUST_RESP (d) AGENT_DISC where "disp" is a 2 digit number indicating the details of call disposition, which is assigned as shown in the table of FIG. 3.

The type 3 acknowledgement message sent from VRU 110 to workstation 140 after an action is completed has the following format:

ACK;[AGENT CALL DROP TALK DROP_SESSION SAY];
[call_id-call id]; [ERROR,er_code ,n];user_id With respect to the acknowledgement message format, "er_code" is a code indicative of the type of error, if any, and n is a 2 digit number indicating that there are only n resources available. Note that acknowledgements to SAY messages are sent after VRU 110 receives the message (before initiating action), while acknowledgements to other messages are sent after the action has been initiated.

The actions taken by VRU 110 in response to receipt of various type 1 messages from workstation 140 are described below.

(a) AGENT message

The AGENT message is a request for VRU 110 to establish or drop or verify the Agent Voice Path (AVP). The AVP is a call from VRU 110 on one of the System Access Trunks (SATs) through switch 161 and other elements in switched network 160 to the customer personnel, so as to be able to talk and listen on test calls. There is a maximum of one AVP for each user_id. It is not necessary to establish the AVP before establishing a test call. Rather, the AVP may be established after a test call is in progress. There are three options for the AGENT message, which are described below. When VRU 110 receives the AGENT;SETUP;digits;user_id message, it picks an available SAT, goes off hook on that circuit, and waits for a wink on the "E" signalling lead. When the wink is detected, it outpulses the digits indicated in the message and sends back the acknowledge message (ACK message) to workstation 140. VRU 110 remembers which SAT it used for the particular user id so that when CALL messages with TLK selected or subsequent TALK messages are received for the same user_id, it can connect the AVP and the particular test call together.

When VRU 110 receives the AGENT; VER;user_id message, it plays two short beeps over the AVP. This indicates that, in fact, the call is an AVP call from VRU 110.

When VRU 110 receives the AGENT;DROP;user_id message, it disconnects any voice connections to the AVP and goes on hook on the SAT. VRU 110 also sends an ACK message to workstation 140.

(b) CALL message

When VRU 110 receives the CALL;call_id-call_id;digits;rings;[TLK NO_TLK];SAY,[0–9];user_id message, it is arranged, for each call_id, to perform call disposition analysis (CDA), to monitor the call supervision, and report both to workstation 140. It will optionally (a) connect the call to the AVP, (b) say a speech phrase over the call, and (c) wait for a touch-tone response that will then be reported to workstation 140.

Specifically, in response to a CALL message, VRU 110 is arranged to select an idle SAT. If the TLK option is in effect (and the AVP is established), VRU 110 connects the SAT to the AVP. The VRU then goes off hook and waits for wink. When the wink on the E signalling lead is detected, VRU 110 outpulses the "digits". After the digits are outpulsed, VRU 110 returns the appropriate acknowledgement message (ACK;CALL) to workstation 140. Note that it is expected that there may be multiple CALL messages received in VRU 110 and associated with the same user_id, i.e., originating from the same technician at one of the workstations 140-1 to 140-n. Also, the CALL messages may be mixed with other messages. This is because a particular technician may initiate a set of test calls to a particular customer, and, while waiting for completion, initiate other calls to other customers. The technician could then make a determination about what to do next, possibly by dropping some of the test calls in the first set, and then request more calls to be initiated to the first customer. Since the capacity of VRU 110 is limited by its internal arrangement and the capacity of facility 115, VRU 110 is arranged so as to prevent the placement any calls and to return an error in the acknowledgement message, in the event that there aren't enough resources to initiate the amount of calls requested in the CALL message.

If the call is answered, and the NO_TLK option is in effect, and the SAY field is not "0", VRU 110 plays the corresponding phrase on the SAT as indicated in the SAY data field.

Figure 4:
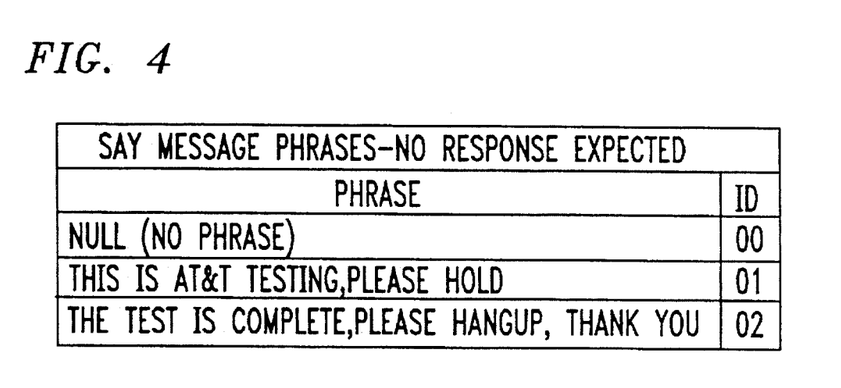
FIGS. 4 and 5 are diagrams illustrating several phrases that may be played by VRU 110 of FIG. 1 in response to CALL messages from workstation 140, and their relationship to identifying ("ident") numbers in the SAY data field in that message. The phrases in FIG. 5 anticipate customer responses, while the phrases in FIG. 4 do not.

There are two types of play interactions. One type plays a phrase over the test call, and the other plays a phrase and waits for a touch-tone response from the customer that VRU 110 interprets and sends to workstation 140. These phrases may also be initiated via the SAY message. Several illustrative phrases and their relationship to identifying ("ident") numbers in the SAY data field in the CALL message are illustrated in FIG. 4. As shown, for "ident"=0, no message is played; for "ident"=1, the message "This is AT&T testing, please hold" is played; while for "ident"=2, the message "The test is complete, please hang up. Thank You" is played. Obviously, other messages can be played for other test conditions.

The program controlling the operation of VRU 110 allows a voice message to be recorded and stored, such that the message is related to an identifying number. That number is used to identify the voice message to be played over a test call. Generic messages and the related "ident" numbers can be provided at the time the VRU is initially configured, and thereafter changed in response to the requests of particular customers.

If the phrase is one that has a possible response from the answering party, VRU 110 listens for a predetermined amount of time as defined in a configuration file. If it receives a response, it returns the CUST_RESP message to workstation 140, indicating the Touchtone response in the data field. The configuration file includes a time, after which the SAY will be repeated. It also includes a field which indicates how many times the SAY will be repeated.

If the called party doesn't respond within the predetermined time, VRU 110 sends a time-out("t") in the CUST_RESP message. If the called party makes an entry other than what VRU 110 requested, the phrase is repeated and the final response is passed to workstation 140.

(c) DROP message

When VRU 110 receives the DROP;call_id-call_id;user_id message, it will, for each call_id, disconnect from the AVP (if attached) and go on hook on the SAT. If there is no voice connection from the AVP to the particular test call in effect, VRU 110 will automatically play a phrase which in effect says "The test is complete, please hang up. Thank You", before dropping the call.

(d) TALK message

When VRU 110 receives the TALK;call_id-call-id;[ON OFF];user_id message, it will, for each call_id, connect the SAT to the AVP for the ON option (if a SAY session is in effect, stop the SAY and barge in), or disconnect the SAT from the AVP for the OFF option.

(e) SAY message

Figure 5:
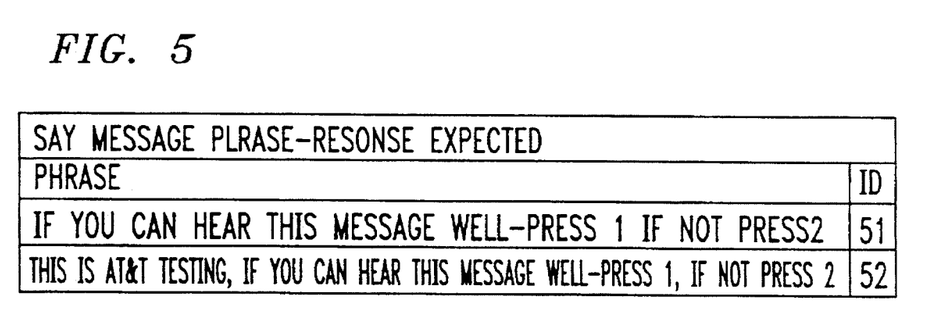

When VRU 110 receives the SAY;call_id;[0–99];user_id message, it will, for each call_id, play the corresponding phrase on the SAT as indicated in the SAY message data field. As noted above, there are two types of play interactions, One type plays a phrase over the test call, and the other plays a phrase and waits for a touch-tone response that it sends to workstation 140. These phrases may also be initiated via the CALL message. Some typical phrases for which no response is expected were described above in connection with FIG. 4. Other typical phrases for which a response is expected, and the "ident" number which triggers VRU 110 to play these voice messages, are illustrated in FIG. 5. Note that the "ident" number is passed to VRU 110 in the data field of the SAY message.

If the phrase is one that has a possible response from the called party, VRU 110 will listen for a predetermined amount of time as defined in the configuration file. If it receives a response, it returns the CUST_RESP message to workstation 140 indicating the Touchtone response in the data field. The configuration file includes a time after which the SAY message will be repeated. It also includes a field which indicates how many times the SAY message will be repeated.

If the called party doesn't respond within the predetermined time, VRU 110 sends a time-out("t") in the CUST_RESP message. If the called party makes an entry other than what VRU 110 requested, the phrase will be repeated and the final response will be passed to workstation 140.

When an AVP drops for some reason other than the AGENT;DROP message being sent from workstation 140, an on-hook signal is sent by the communications network toward VRU 110. When this happens, VRU 110 sends the AGENT_DISC message to workstation 140. VRU 110 then disables voice connections to the test calls.

(f) DROP_SESSION message

When VRU 110 receives the DROP_SESSION;user_id message, it will, for each call in effect for the user_id, play a phrase indicating that "The test is complete, please hang up. Thank You" (if TALK is not in effect), go on hook on SAT, remove connections to AVP, and drop the AVP.

Having thus described messages originating in workstation 140 and the resulting actions taken by VRU 110 in response thereto, it is instructive to now consider the messages generated by VRU 110 during the testing process. Generally speaking, and most importantly, VRU 110 monitors call supervision signals and performs call disposition analysis for the duration of each test call, after the test call has been made in response to the CALL message. Monitoring is automatic, since VRU 110 can recognize different sound patterns and supervisory signal indications, as well as different Touchtone patterns entered by customer personnel. For each call supervision state change, VRU 110 sends the SUPV message to workstation 140. Since the called number may hang up (go on hook) before the DROP message is received from workstation 140, the monitoring function is not aborted when answer supervision is received.

When VRU 110 performs call disposition analysis after a test call has been made, it sends the CDA message to workstation 140 after a particular status or disposition has been ascertained. For example, if the call is ringing, VRU recognizes this condition and declares the disposition as "4-no answer" when it detects the number of rings in the "rings" field in the CALL message.

Details of the individual type 2 messages, ie, those generated by VRU 110 and sent to workstation 140, are provided below:

(a) SUPV message

VRU 110 monitors the call supervision signals and sends the SUPV message for each call. Since the called number may hang up at any time, i.e., before or after call disposition is determined, VRU 110 reports only the call supervision (and not call disposition) to the workstation 140.

(b) CDA message

VRU 110 sends the CDA message to workstation 140 after call disposition is ascertained. VRU 110 sends CDA as "No answer" on any test call, only after waiting for number of rings received in the CALL message.

(c) CUST_RESP message

VRU 110 sends CUST_RESP message if workstation 140 requests a customer response through Say_ID. There are two types of play interactions. One type plays a phrase over the test call, and the other plays a phrase and waits for a touch-tone response that it sends to workstation 140. These phrases may also be initiated via the SAY message. If the phrase is one that has a possible response from the called party, VRU 110 listens for a predetermined time threshold as defined initially in the configuration file. If it receives a response, it returns the CUST_RESP message to workstation 140 indicating the Touchtone response in the "Value" field. Valid "Values" are 0–9,*,#,t, where "t" means timeout.

The configuration file includes a threshold time, after which the SAY message is repeated. It also includes a field which indicates how many times the SAY message is repeated. If the called party doesn't respond within the predetermined time, VRU 110 sends a time-out("t") in the CUST_RESP message. If the called party makes an entry other than what the VRU 110 requested, the statement is repeated and the final response will be passed to workstation 140.

(d) AGENT_DISC message

If the technician hangs-up, VRU 110 recognizes and disables voice connections to test calls and sends back the AGENT_DISC message to workstation 140. VRU 110 drops the session after receiving the DROP_SESSION message.

While the foregoing description related to specific messages sent between VRU 110 and workstation 140 and their formats, and also specific interface requirements in communicating those messages between workstation 140 and VRU 110, certain additional information may be included in all messages. This additional information may include some or all of the following fields:

(a) "Trans_ID" is a unique transaction identification number assigned to each message in the communication. The length of this field is 2 bytes.

(b) "#Bytes" gives the total number of bytes used in the message including the number of bytes used for this field. The length of this field is 4 bytes.

(c) "User_ID" is assigned by workstation 140 to each technician at center 101. This is used to identify the test call results related to the particular technician. The length of this field is 2 bytes.

(d) "Digits" gives the dialed number to be outpulsed by VRU 110. The dialed number could be a Plain Old Telephone Service (POTS) number, an 800 Number, an Action Point Number (APN), a Routing Translation number (RTN), or a Plant test number (PTN). The length of this field is 32 bytes.

(e) "Call_ID1" is used for specifying the range of calls. Call_ID1 indicates the starting number of the range. The length of this field is 2 bytes.

(f) "Call_ID" is used to identify the specific test call. The length of this field is 2 bytes.

(g) "Call_ID2" indicates the ending number of the range. The length of this field is 2 bytes.

(h) "Rings" gives the number of rings that a technician wants to wait for the Call disposition on a call in which the disposition will be "No answer". The length of this field is 2 bytes.

(i) "Say_ID" gives the number related to the phrase that a technician wants to play through VRU 110 during testing. The length of this field is 2 bytes.

(j) "Err_code" gives the code regarding failures/errors during the communication between workstation 140 and VRU 110. This also gives the number of available resources for test calls. The length of this field is 3 bytes.

(k) "Disp_ID" indicates the code for call disposition. There are twenty-two different codes associated with this field. The length of this field is 2 bytes.

The configuration file described above, which is stored in VRU 110, is created and updated in response to a system administration command. As stated above, the configuration file includes a time after which the SAY will be repeated. It also includes a field which indicates how many times the SAY message will be repeated.

Figure 6:
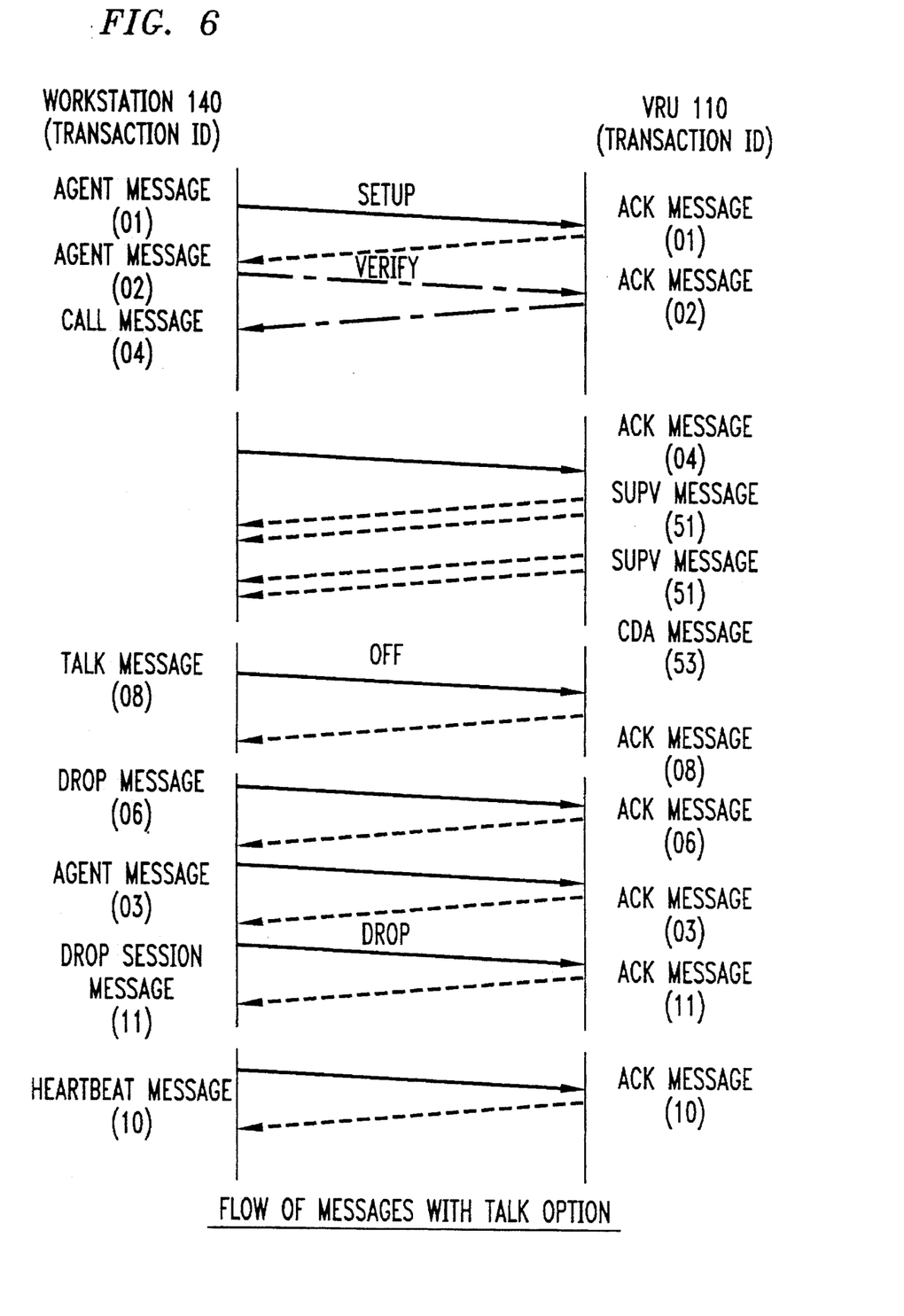
Figure 7:
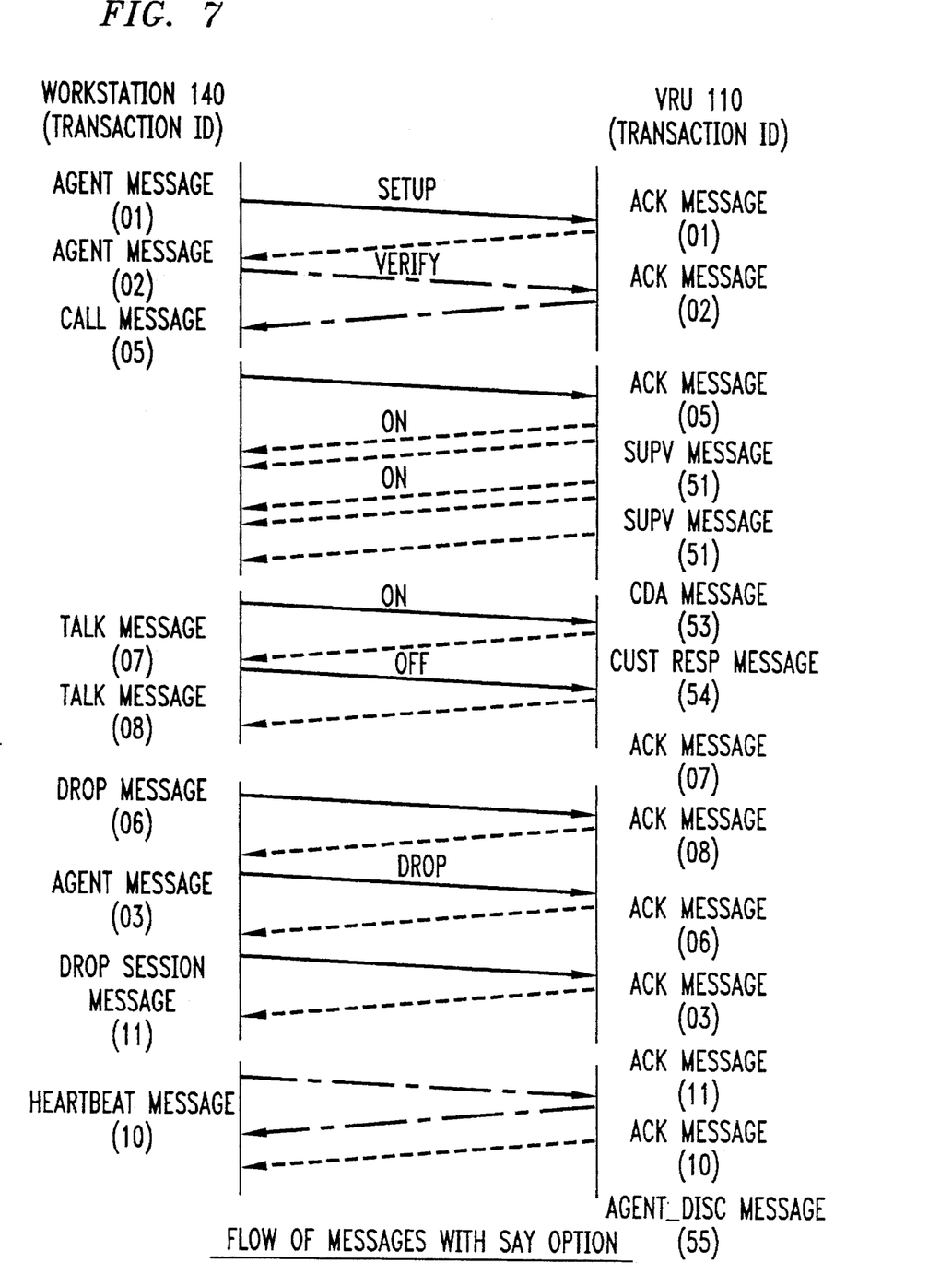

FIGS. 6 & 7 present the flow of messages with TALK and SAY options, and illustrate the generation of type 3 acknowledgement (ACK) messages. Solid lines with arrows indicate that the message is from workstation 140 to VRU 110. Dashed lines indicate optional messages either from workstation 140 or VRU 110. Dotted lines indicate that the message is from VRU 110 to workstation 140. These messages need not be in sequential order as shown in the figures. For example, the DROP message and the DROP_SESSION message can occur anywhere in the flow. The transaction ID's denoted in parenthesis under each message name is a short form of the corresponding message name, and is recognized as such by VRU 110 and workstation 140.

Figure 8:
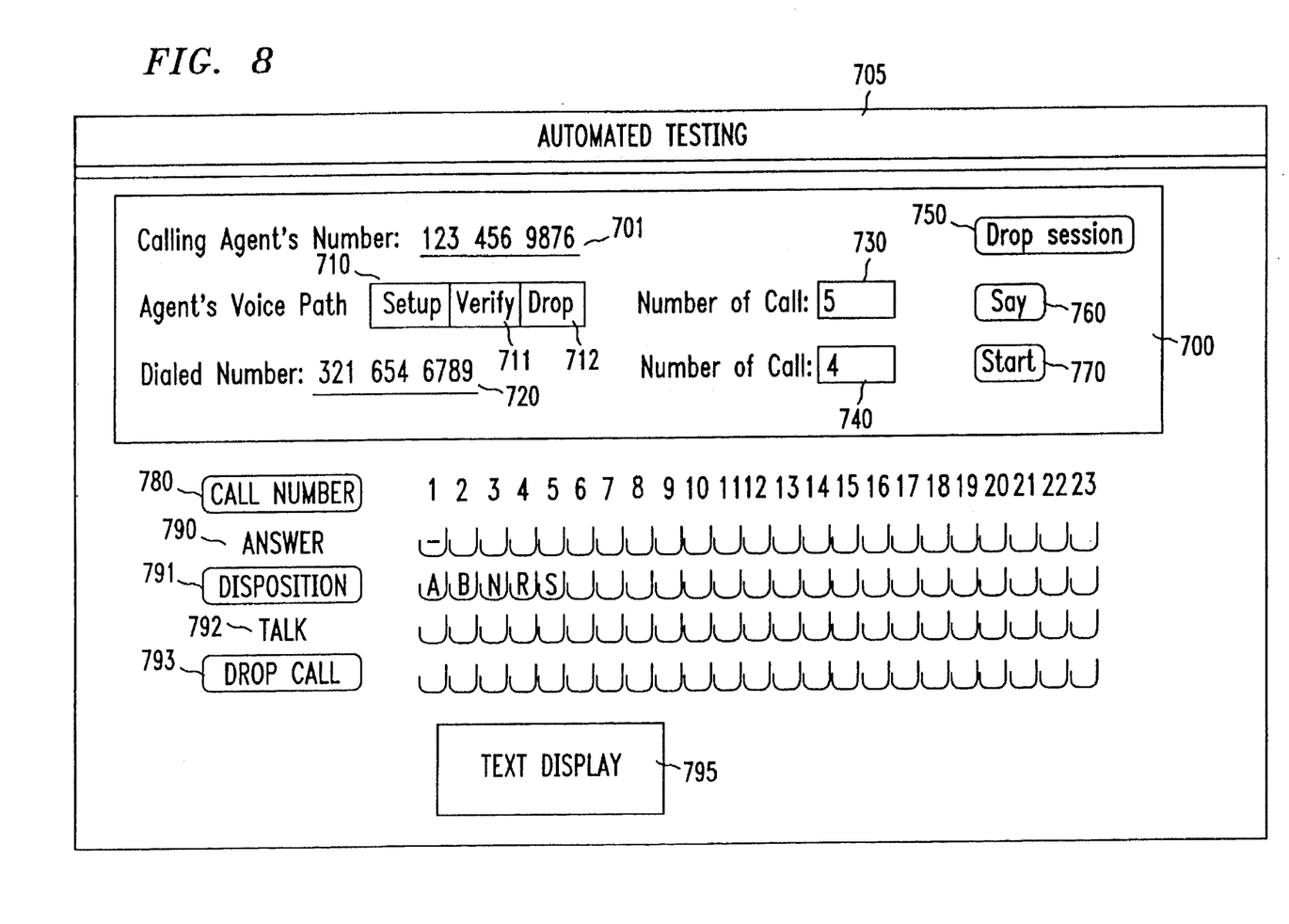
FIG. 8 illustrates a typical user interface screen that may be used by a technician at one of the workstations 140-1 to 140-n of FIG. 1.

FIG. 8 illustrates a typical user interface screen that may be used by a technician at one of the workstations 140-1 to 140-n. By clicking the cursor on the title strip 705, the technician can close the window or refresh it.

The control panel 700 at the top of the window has the following elements:

A field 701 to enter the technician's number. This is used by VRU 110 to establish the Agent's Voice Path (AVP) so that the technician may talk and listen on test calls. "Buttons" 710–712 to click on with the mouse to:

(a) request VRU 110 to "setup" the AVP to the technician's number;

(b) request VRU 110 to "Verify" the AVP by sending two short audible beeps over the AVP to the technician identifying the call as a test call for that technician;

(c) request VRU 110 to "Drop" the AVP.

A field 720 to enter the Dialed Number. The following number types are allowed: POTS (Plain Old Telephone Service) number;, 800 (800 number); APN (Action Point Number); and RTN (Routing Translation Number). This number will be passed to VRU 110 to make test calls. Note that if trunks with the characteristics of those originating at a local exchange carrier switch are provided in facility 115, an additional field, not shown, may be included in the screen in which to enter the ANI to be included with the test call. In this event, the CALL message described above is modified to include an additional field for the ANI.

A field 730 to enter the number of calls to be made in a particular set of test calls.

A field 740 to enter the number of rings after which VRU 110 declares a "Ring/No Answer" condition.

A button 750 to Drop Session.

A "Say" button 760 that, after all other essential information and actions have been taken, causes a message to be sent to VRU 110 to launch test calls, say particular phrases, and listen for touchtone responses, if necessary (if TALK is not in effect).

Below control panel 700, there is a CALL NUMBER label 780. Against this label, there are numbers (numbers 1 to 23 are illustrative, as shown in FIG. 8) representing the maximum number of test calls a technician can make.

Below the CALL NUMBER label 780 there are 4 rows 790–793 of 23 buttons on the screen. These enable the technician using the system to perform the following:

To see the "E" lead status or call supervision of each call (ANSWER/DISCONNECT)

Figure 9:
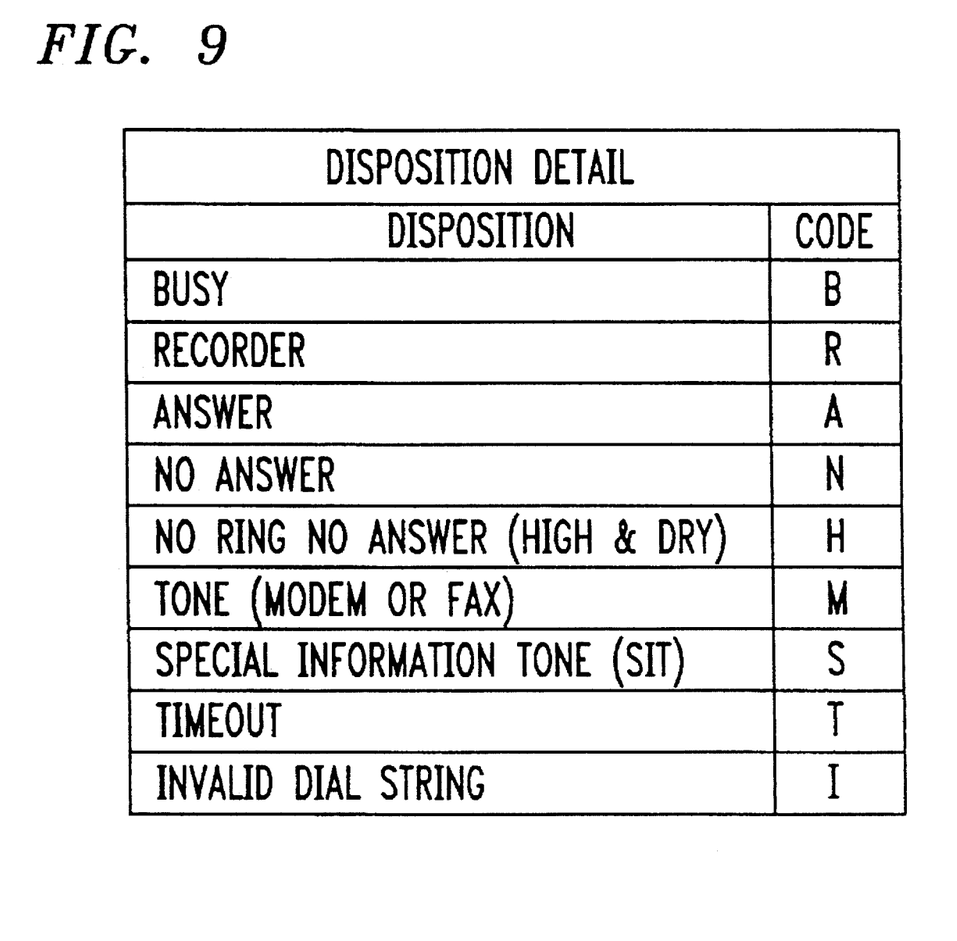
FIG. 9 is a table illustrating call disposition codes and the corresponding disposition of calls represented by each code.

To see the Call Disposition of a call or all calls (DISPOSITION). The codes and corresponding disposition may be as shown in FIG. 9.

To talk and listen on any individual call up to a maximum of six calls simultaneously (TALK).

To Drop a call or all calls (DROP CALL).

At the bottom left of the window, a message window 795 indicates that the technician may exit from the window by clicking on "Drop Session" button 750.

While the system of FIG. 1 includes several Attachment Unit Interface (AUI) adapters 124, 142-1 to 142-n and 111 for physically interconnecting workstations 140-1, workstation 140 and VRU 110, it is to be noted that these adapters can be replaced, if desired, by coaxial cable.

In order to further automate the functions performed at test center 101, the system of our invention may be arranged so that when a possible abnormality or malfunction is detected, a message is generated and transmitted to other systems that arrange for and/or perform maintenance. These other systems can be on the same workstation, in the same work center, or elsewhere.

Various modifications and adaptations can be made to our invention. Accordingly, the invention is to be limited only by the claims. For example, while FIG. 1 illustrates VRU 110 and workstations 140-1 to 140-n in a single test center 101, in some embodiments it may be desirable to physically separate these hardware elements. The same is true with respect to server 120. If it is desired to locate these elements in physically distant cites, LAN 130 may be replaced by a suitable wide area network.

We claim:

1. A system for testing communications circuits comprising a voice response unit connected to a telecommunications network, said VRU arranged to perform a series of actions in response to messages, said actions including (a) initiating at least one test call, (b) playing pre-stored speech phrases to the answering party, and (c) monitoring the progress and disposition of said at least one test call, said monitoring including establishing an agent voice path whereby a technician can listen on said test call and communicate with said answering party, and a workstation arranged to send messages to said VRU to initiate and conduct testing by performing a sequence of said actions.

2. A system for testing communications circuits, comprising (a) means for initiating a plurality of simultaneous test calls, (b) means for monitoring the status and disposition of each of said test calls, said monitoring including establishing an agent voice path whereby a technician can listen on said test calls, and (c) means for transmitting pre-stored speech phrases to the answering party receiving said test calls, and detecting requested touch-tone responses entered by said answering party, and (d) means for displaying the results of said test calls on a graphical display device.

3. A communications circuit test system comprising,

A VRU, means including trunks for connecting said VRU to a switch in a telecommunications network, means in said VRU arranged to initiate at least one test call to a customer's telephone number via an available circuit in one of said trunks, means for playing an appropriate stored message when said test call is answered by said customer, means in said VRU for monitoring said at least one test call to detect supervisory signals, means in said VRU arranged to perform call disposition analysis by monitoring said test call to detect audible conditions indicative of circuit abnormalities, means for generating a message indicative of the existence of said abnormality, and means for establishing an agent voice path whereby a technician can listen on said test call and communicate with said customer.

4. The communications circuit test system in claim 3 wherein said system includes means for displaying the status of said test call.

5. The communications circuit test system of claim 3 wherein the system further includes means for displaying information pertaining to said test system.

* * * * *